United States Patent
Rideau et al.

(10) Patent No.: US 10,625,874 B2
(45) Date of Patent: Apr. 21, 2020

(54) STRUCTURE FOR FEEDING AIR TO AN AUXILIARY POWER UNIT IN AN AIRCRAFT

(71) Applicant: MICROTURBO, Toulouse (FR)

(72) Inventors: Jean-Francois Rideau, Tournefeuille (FR); Fabien Silet, Pechbonnieu (FR)

(73) Assignee: SAFRAN POWER UNITS, Toulouse (FR)

( * ) Notice: Subject to any disclaimer, the term of this patent is extended or adjusted under 35 U.S.C. 154(b) by 324 days.

(21) Appl. No.: 14/763,796

(22) PCT Filed: Jan. 23, 2014

(86) PCT No.: PCT/FR2014/050124
§ 371 (c)(1),
(2) Date: Jul. 27, 2015

(87) PCT Pub. No.: WO2014/118455
PCT Pub. Date: Aug. 7, 2014

(65) Prior Publication Data
US 2015/0367952 A1 Dec. 24, 2015

(30) Foreign Application Priority Data

Jan. 29, 2013 (FR) ...................................... 13 50726

(51) Int. Cl.
*B64D 33/02* (2006.01)
*F02C 7/08* (2006.01)
(Continued)

(52) U.S. Cl.
CPC ............. *B64D 33/02* (2013.01); *B64D 41/00* (2013.01); *F01D 25/10* (2013.01); *F02C 7/08* (2013.01);
(Continued)

(58) Field of Classification Search
CPC .................... B64D 33/02; B64D 41/00; B64D 2033/0213; F02C 7/08
See application file for complete search history.

(56) References Cited

U.S. PATENT DOCUMENTS

| 4,730,486 A | * | 3/1988 | Zompolas | B64D 41/00 |
| | | | | 244/1 R |
| 5,442,905 A | | 8/1995 | Claeys et al. | |

(Continued)

FOREIGN PATENT DOCUMENTS

| EP | 1767455 | 3/2007 |
| EP | 1843022 | 10/2007 |

(Continued)

OTHER PUBLICATIONS

International Search Report and Written Opinion with English Language translation, dated May 15, 2014, Application No. PCT/FR2014/050124.

(Continued)

*Primary Examiner* — Brian M O'Hara
*Assistant Examiner* — Keith L Dixon
(74) *Attorney, Agent, or Firm* — Womble Bond Dickinson (US) LLP

(57) ABSTRACT

The invention concerns a structure (3) for feeding air to an auxiliary power unit (2) of an aircraft (1) comprising a pressurized cabin (10) and an auxiliary power unit (2), the structure comprising: a pipe (30) for feeding air to the auxiliary power unit; a unit (4) for controlling the airflow fed to the auxiliary power unit; and a valve (31) for the intake of air outside the aircraft, disposed at the inlet of the feed pipe (30), the opening of the valve being driven by the control unit (4). The structure is characterized in that it further comprises a circuit (32) for injecting air from the pressurized cabin into the auxiliary power unit feed pipe.

(Continued)

The invention also concerns a method for feeding air to an auxiliary power unit.

8 Claims, 1 Drawing Sheet

(51) Int. Cl.
  F01D 25/10 (2006.01)
  B64D 41/00 (2006.01)
(52) U.S. Cl.
  CPC ..... *B64D 2033/0213* (2013.01); *Y02T 50/675* (2013.01)

(56) References Cited

U.S. PATENT DOCUMENTS

| | | | | |
|---|---|---|---|---|
| 5,911,388 | A * | 6/1999 | Severson | B64D 13/06 244/118.5 |
| 5,956,960 | A * | 9/1999 | Niggeman | B64D 13/06 60/785 |
| 6,283,410 | B1 * | 9/2001 | Thompson | B64D 41/00 244/59 |
| 6,427,471 | B1 * | 8/2002 | Ando | B64D 13/06 62/402 |
| 6,776,002 | B1 * | 8/2004 | Ho | B64D 13/06 62/401 |
| 7,618,007 | B1 * | 11/2009 | Dahlgren | B64D 41/00 244/54 |
| 7,721,554 | B2 * | 5/2010 | Balan | B64D 41/00 244/58 |
| 9,205,927 | B2 * | 12/2015 | Shepard | B64D 41/00 |
| 9,254,924 | B2 * | 2/2016 | Nager | B64D 41/00 |
| 9,302,775 | B2 * | 4/2016 | Houssaye | B64D 13/06 |
| 9,404,419 | B2 * | 8/2016 | Haillot | B64D 41/00 |
| 9,617,006 | B2 * | 4/2017 | Brugger | B64D 13/08 |
| 2009/0088063 | A1 | 4/2009 | Schwarz | |

FOREIGN PATENT DOCUMENTS

| | | |
|---|---|---|
| EP | 1767455 A3 | 1/2008 |
| EP | 1902954 | 3/2008 |
| EP | 1902954 A3 | 8/2013 |
| EP | 1843022 A3 | 4/2014 |
| GB | 1316275 | 5/1973 |
| JP | 2008-080934 A | 4/2008 |
| JP | 2008-132973 A | 6/2008 |

OTHER PUBLICATIONS

French search report, dated Jun. 5, 2015, Application No. 1350726.
Grosse, Max, et al., "Coded Aperture Projection", ACM Transactions on Graphics, vol. 29, No. 3, Article 22, (Jun. 2010).
Levin, Anat, et al., "Image and Depth from a Conventional Camera with a Coded Aperture", ACM Transactions on Graphics, vol. 26, No. 3, Article 70, (Jul. 2007).
Li, Yang, et al., "Simulation of Depth from Coded Aperture Cameras with Zemax", VRCAI '11 Proceedings of the 10th International Conference on Virtual Reality Continuum and its Applications in Industry, (Dec. 11, 2011), 463-466.
Trouve, Pauline, et al., "Passive depth estimation using chromatic aberration and a depth from defocus approach", Applied Optics, vol. 52, No. 29, (Oct. 10, 2013).
Office Action received for Japanese Patent Application No. 2015-554230, dated Nov. 28, 2017, 6 pages (3 pages of English Translation and 3 pages of Office Action).
International Preliminary Report on Patentability received for PCT Patent Application No. PCT/FR2014/050124, dated Aug. 13, 2015, 20 pages (12 pages of English Translation and 8 pages of Original Document).

* cited by examiner

STRUCTURE FOR FEEDING AIR TO AN AUXILIARY POWER UNIT IN AN AIRCRAFT

FIELD OF THE INVENTION

The field of the invention is that of auxiliary power units installed in aircrafts, and more specifically that of architectures for supplying such units with air.

PRIOR ART

An aircraft includes several power generating sources, including:
- the main engines, which provide propulsion for the aircraft,
- an auxiliary engine called the auxiliary power unit or APU, the function whereof is to supply non-propulsive power (for example electrical power, hydraulic and pneumatic pressure, air conditioning, etc.) to the aircraft on the ground and in flight, when the main engines are not capable of doing so or to reduce the consumption of fuel by the aircraft, and
- an emergency power source, the function whereof is to supply emergency electrical power to critical elements of the aircraft (flight controls and critical flight instruments) in the event of loss of other power generation sources.

Aircrafts can obtain a classification called ETOPS, an acronym of "extended twin-engine operations," allowing them to use an air route comprising sectors located more than one hour from an emergency airport. To do this, an aircraft must among other things be equipped with an auxiliary power unit APU having a capability of cold starting at very high altitudes, that is between 11900 meters (39000 feet) and 12500 meters (41000 feet) depending on carriers.

It would be desirable to increase this ceiling for some aircraft flying at higher altitudes, up to 15500 meters (51000 feet) so as to limit the impact of a failure of the main engines during flight.

An auxiliary power unit is of the type including a turbomachine including an inverted combustion chamber associated with a system for injecting air and fuel.

It is however difficult to start such a turbomachine at altitude because the air at altitude is poor in oxygen and the fuel is cold and thus more difficult to ignite. It is therefore necessary to maintain a starting window—that is all the parameters of richness in oxygen, pressure, temperature and air flow which must be controlled to allow igniting the fuel—for a sufficiently long time for the turbomachine of the auxiliary power unit to diverge, that is to deliver sufficient power to drive the unit.

The higher the altitude of the aircraft, the more the starting window of the group is narrow and difficult to detect and maintain.

SUMMARY OF THE INVENTION

The invention has as its aim to compensate at least one of the shortcomings mentioned above, by proposing an architecture for supplying air to an auxiliary power unit making starting of the auxiliary power unit at altitude easier.

In this regard, the invention has as its object an architecture for supplying air to an auxiliary power unit of an aircraft comprising a pressurized cabin and an auxiliary power unit of the type including a combustion chamber for fuel, the architecture including:
- a duct for supplying air to the auxiliary power unit,
- a unit for controlling the flow of air supplied to the auxiliary power unit, and
- a valve for allowing outside air into the aircraft, positioned at the inlet of the supply duct, the opening of said valve being controlled by the control unit, the architecture being characterized in that it further includes a circuit for injecting air coming from the pressurized cabin into the supply duct of the auxiliary power unit.

Advantageously but optionally, the architecture for supplying air according to the invention can further have at least one of the following features:
- the architecture is in an aircraft further including a circuit for exhausting air coming from the cabin toward the outside of the aircraft, and the air injection circuit is connected to the circuit for exhausting air to the outside of the aircraft by a distribution valve, the opening whereof is controlled by the control unit to draw a proportion of a flow of air circulating in the exhaust circuit, and includes at its exit a nozzle for injecting said proportion into the supply duct of the auxiliary power unit.
- the distribution valve is designed to draw from the flow of air circulating in the exhaust circuit a proportion that varies continuously between a first proportion where the entire flow of air is drawn, and a second proportion wherein a zero proportion is drawn.
- the control unit is designed to control the opening of the outside air admission valve and the opening of the distribution valve according to a phase of operation of the auxiliary power unit.
- the control unit is designed to control the opening of the outside air admission valve and the opening of the distribution valve according to a rotation speed of a rotating shaft of the auxiliary power unit.

The invention also has as its object an aircraft comprising a pressurized cabin, an auxiliary power unit and an architecture for supplying air to the auxiliary power unit according to the invention.

Finally, the invention has as is object a method for supplying air to an auxiliary power unit of the type including a combustion chamber for fuel in an aircraft having a pressurized cabin and an architecture for supplying air according to the invention, the method being characterized in that supplying air to the auxiliary power unit comprises at least one of supplying air coming from the outside of the aircraft and recovered from the pressurized cabin, and in that the proportions of air coming from the outside and air recovered from the pressurized cabin are controlled according to a phase of operation of the auxiliary power unit.

Advantageously but optionally, the method according to the invention can further include at least one of the following characteristics:
- the proportions of air coming from the outside and the air recovered from the pressurized cabin are controlled according to a rotation speed of a rotating shaft of the auxiliary power unit.
- During the process:
  - during a starting phase of the auxiliary power unit, air supplied to said unit comes solely from the air recovered from the pressurized cabin, and
  - during a transitional phase between the starting phase and a phase of stabilized operation, the supply of air to the auxiliary power unit includes a growing flow of air coming from the outside and a growing flow of air coming from the pressurized cabin.

during a phase of stabilized operation, supply of air to the auxiliary power unit comes solely from the pressurized cabin, or comes in part from the cabin and in part from the outside air.

The invention also has as its object an aircraft comprising such an architecture, and a method for supplying air to an auxiliary power unit of an aircraft.

DESCRIPTION OF THE FIGURES

Other features, aims and advantages of the invention will be revealed by the description that follows, which is purely illustrative and not limiting, and which must be read with reference to the appended drawings wherein.

DETAILED DESCRIPTION OF AT LEAST ONE EMBODIMENT OF THE INVENTION

Figure 1:
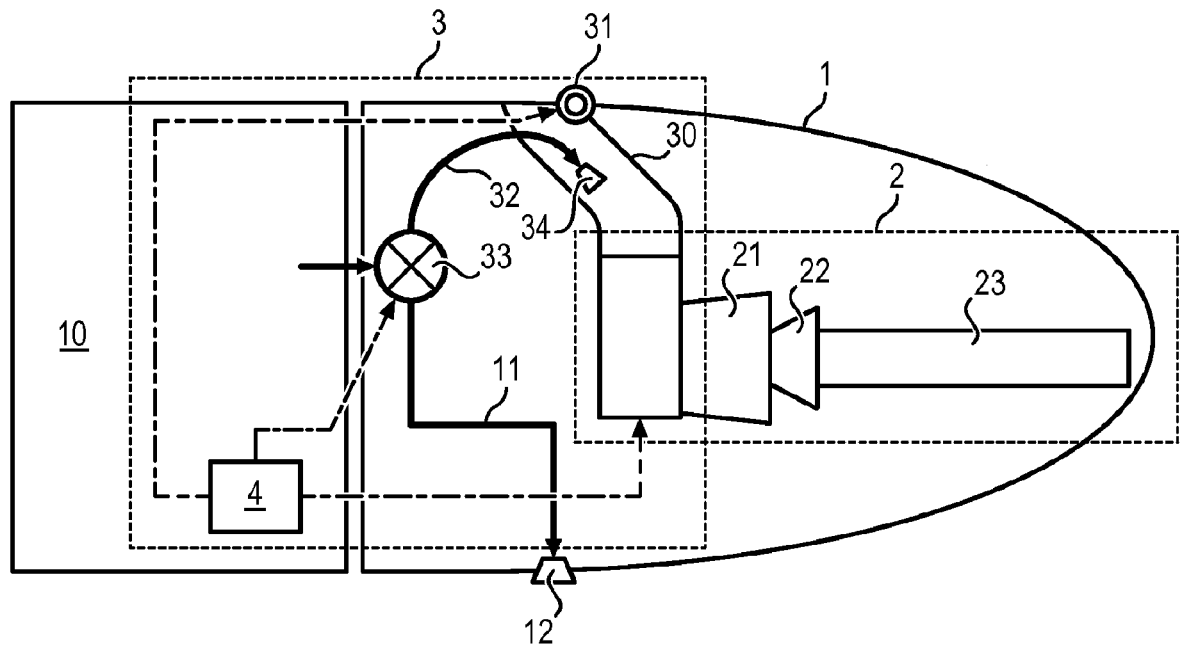
FIG. 1 shows schematically an aircraft equipped with an architecture for supplying air to an auxiliary power unit according to one embodiment of the invention.

With reference to FIG. 1, we have shown an aircraft 1 comprising a pressurized cabin 10, a passenger cabin for example. By pressurized cabin is meant a cabin in which the air that it contains is pressurized with respect to the outside, particularly when the aircraft is in flight.

The aircraft further comprises a circuit 11 for exhausting air contained in the cabin to the outside of the aircraft, comprising in particular a valve 12 for exhausting air toward the outside, to allow renewal of the air contained in the cabin.

A certain flow of air, depending on the size of the cabin, flows continuously in this circuit, to be exhausted so as to allow renewal of the air contained in the cabin.

The aircraft also includes an auxiliary power unit 2, which includes a combustion chamber for fuel, a turbine for driving an air compressor through a rotating transmission shaft shown schematically in the figure under reference 21, an exhaust nozzle 22 and a duct 23 for exhausting the gasses.

The auxiliary power unit also comprises a circuit for supplying fuel (not shown) and an architecture for supplying air 3.

This architecture includes a duct 30 for supplying air to the auxiliary power unit, at the inlet thereto, and a valve 31 for supplying air from outside the aircraft to the inlet to the duct 30, in order to supply the auxiliary power unit with air.

The architecture further comprises a control unit 4 configured to control the opening of the valve 31 so as to regulate the flow of outside air supplying the auxiliary power unit.

Finally, the architecture 3 for supplying air to the auxiliary power unit also includes a circuit 32 for injecting air recovered from the pressurized cabin into the duct 30 for supplying the auxiliary power unit. This circuit comprises a distribution valve 33 allowing its connection to the circuit 11 for exhausting air from the pressurized cabin, and a nozzle 34 for injecting the air recovered from the pressurized cabin into the supply duct 30.

Advantageously, the control unit 4 is also configured for controlling the opening of the distribution valve 33, through a plurality of configurations to vary the proportion of air drawn from the flow of air circulating in the exhaust circuit, from a configuration of the valve, called closed, wherein a zero flow of air is drawn from the exhaust circuit, to a second configuration, called open, wherein the entirety of the flow of air in the exhaust circuit is drawn to supply the auxiliary power unit.

Advantageously, the proportion of air taken from the exhaust circuit is continuously variable between the open and closed configurations of the distribution valve 33.

In this manner, the auxiliary power unit can benefit at the same time from being supplied with outside air which, while the aircraft is in flight, is poor in oxygen and cold but can have a high flow rate, and from being supplied with air coming from the cabin, which is richer in oxygen and at a higher temperature but at a lower flow rate.

The control unit 4 advantageously controls the opening of the outside air admission valve 31 and the distribution valve 33 according to a phase of operation of the auxiliary power unit APU 2. Indeed, while it is starting, the APU unit 2 does not require a high air flow rate, and in addition this flow must be controlled so as to ensure a large enough starting window. On the other hand, when the APU unit is started and operating, the required flow of air needed for its operation is larger.

Figure 2:
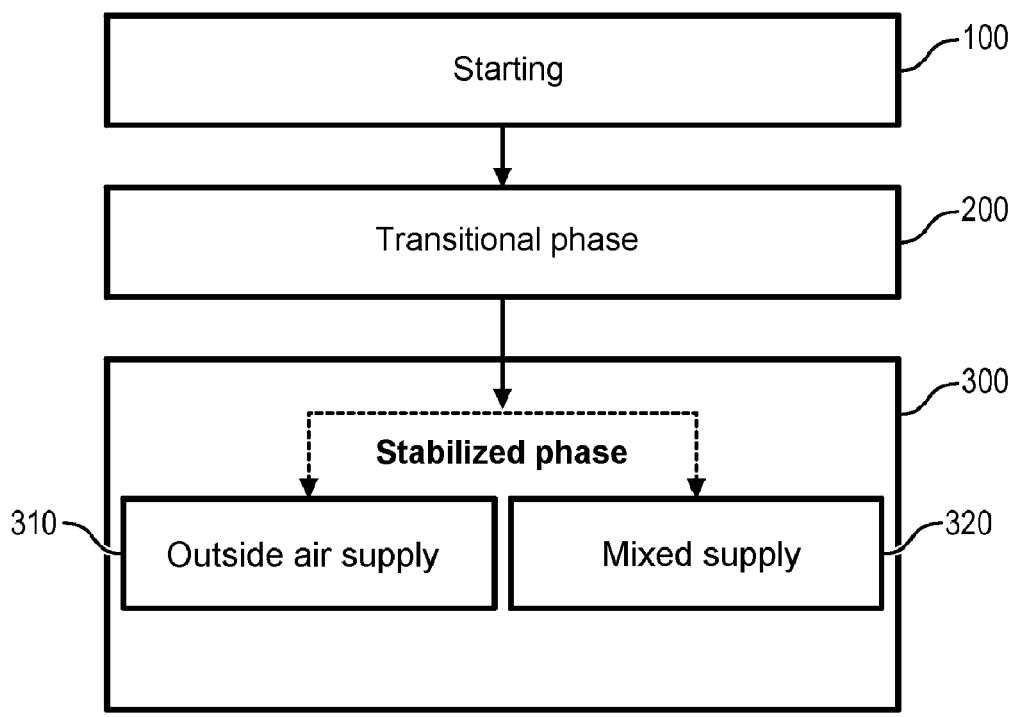
FIG. 2 shows the principal steps of the method for supplying air to an auxiliary power unit according to one embodiment of the invention.

The control unit is therefore configured to implement the method for supplying air to the auxiliary power unit described hereafter with reference to FIG. 2.

During starting 100, to ignite the combustion chamber of the auxiliary power unit, the control unit 4 controls the valve 31 so that it remains closed and opens the valve 33 so that the entire supply of air to the APU unit comes from the cabin. The proportion of air drawn from the exhaust circuit 11 is variable depending on the dimensioning of the aircraft and of its different components. In circumstances where the start of the APU group takes place while the aircraft is in flight in altitude, the air coming from the cabin facilitates the start because it is richer in oxygen and has a higher temperature than outside air (e.g. of the order of 20° C. while the outside air has a negative temperature).

In the transitional phase 200, once the combustion chamber of the auxiliary power unit 2 is ignited and begins to diverge, the control unit 4 can then progressively open the valve 31 and the valve 33 to cause a greater flow of air, coming both from the cabin and from the outside atmosphere.

Finally, in the stabilized phase 300, the control unit 4 can, according to a first implementation mode 310, progressively close the distribution valve 33 so that the air supplied to the auxiliary power unit comes exclusively from outside, in which case a zero proportion of air is drawn from the exhaust circuit 11.

As a variant 320, the control unit can maintain the two valves 31 and 33 open so that the air supplied to the auxiliary power unit includes both air coming from the outside and air recovered from the cabin 10.

Very advantageously, for better accuracy in controlling valves 31 and 33, their control by the control unit is slaved to the rotation speed of the rotating shaft of the auxiliary power unit.

The architecture proposed therefore facilitates the starting of the auxiliary power unit of an aircraft when it is in flight, and particularly when it is at altitude in an atmosphere poor in oxygen, because supply of air during starting has a low flow rate and is richer in oxygen than that of air in the atmosphere. Starting is facilitated.

The invention claimed is:

1. An architecture for supplying air to an auxiliary power unit of an aircraft, comprising a pressurized cabin, a circuit for exhausting air from the cabin to the outside of the aircraft, and an auxiliary power unit of the type including a combustion chamber for fuel, the architecture including:
- a supply duct for supplying air coming from outside the aircraft to the auxiliary power unit,
- a unit for controlling the flow of air supplied to the auxiliary power unit via said supply duct,
- a first valve for admitting air from outside the aircraft, positioned at the inlet to the supply duct, the opening of said first valve being controlled by the control unit,
- a circuit for injecting air coming from the pressurized cabin into the supply duct,
- wherein the circuit for injecting air is connected to the circuit for exhausting air toward the outside of the aircraft through a distribution valve, the opening whereof is controlled by the control unit to draw a proportion of a flow of air circulating in the exhaust circuit and to inject said proportion of the flow of air into the supply duct through a nozzle located at the exit of the of the injection circuit,
- wherein the control unit controls the distribution valve to provide a continuously variable proportion of air between a first proportion wherein the entirety of the flow of air circulating in the exhaust circuit is drawn, and a second proportion wherein a zero proportion of air circulating in the exhaust circuit is drawn,
- wherein said first valve and said distribution valve are each progressively controlled by said control unit so that the flow of air supplied to the auxiliary power unit is a determined variable mixture of air supplied from said air from outside the aircraft and said air from said pressurized cabin, said determined variable mixture determined by operation of said control unit.

2. The architecture according to claim 1, wherein the control unit is designed to control the opening of the outside air admission valve and the opening of the distribution valve depending on a phase of operation of the auxiliary power unit.

3. The architecture according to claim 1, wherein the control unit is designed to control the opening of the outside air admission valve and the opening of the distribution valve according to a rotation speed of a rotating shaft of the auxiliary power unit.

4. An aircraft comprising a pressurized cabin and an auxiliary power unit, wherein said aircraft further includes an architecture for supplying air to the auxiliary power unit according to claim 1.

5. A method for supplying air to an auxiliary power unit of the type having a combustion chamber for fuel, in an aircraft comprising a pressurized cabin, an exhaust circuit for exhausting air from the cabin to the outside of the aircraft, an auxiliary power unit of the type including a combustion chamber for fuel, and an injection circuit for injecting air coming from the pressurized cabin into a supply duct of the auxiliary power unit, said method comprising steps of:
- supplying a flow of air coming from outside the aircraft to the auxiliary power unit through the supply duct,
- controlling the flow of air supplied to the auxiliary power unit via said supply duct by:
- controlling opening of a first valve for admitting air from outside the aircraft, said first valve being positioned at an inlet to the supply duct,
- injecting air coming from the pressurized cabin into the supply duct,
- controlling an opening of a distribution valve to provide a continuously variable proportion of air between a first proportion wherein the entirety of the flow of air circulating in the exhaust circuit is drawn, and a second proportion wherein a zero proportion of air circulating in the exhaust circuit is drawn, wherein the distribution valve connects the circuit for injecting air is connected to the circuit for exhausting air toward the outside of the aircraft to draw a proportion of a flow of air circulating in the exhaust circuit and to inject said proportion of the flow of air into the supply duct through a nozzle located at the exit of the of the injection circuit,
- wherein said controlling of said first valve and said distribution valve is progressive so that the flow of air supplied to the auxiliary power unit is determined variable mixture of air supplied from said air from outside the aircraft and said air from said pressurized cabin, said determined variable mixture determined by operation of a control unit.

6. The method according to claim 5, wherein the proportion of flow of air circulating in the exhaust circuit and the proportion of flow of air into the supply duct are controlled according to a rotation speed of a rotating shaft of the auxiliary power unit.

7. The method according to claim 5, wherein,
- during a starting phase of the auxiliary power unit, the supply of air to said unit comes exclusively from the air recovered from the pressurized cabin, and
  - during a transitional phase between the starting phase and a stabilized operation phase, the supply of air to the auxiliary power unit includes an increasing flow of air coming from the outside and an increasing flow of air coming from the pressurized cabin.

8. The method according to claim 7 wherein, during a stabilized operation phase, the supply of air to the auxiliary power unit comes solely from the pressurized cabin, or comes partly from the cabin and partly from outside air.

* * * * *